United States Patent
Kuhn et al.

(10) Patent No.: US 11,982,365 B2
(45) Date of Patent: May 14, 2024

(54) VALVE AND METHOD FOR CONTROLLING A FLOW MEDIUM USING THE VALVE

(71) Applicant: Schaeffler Technologies AG & Co. KG, Herzogenaurach (DE)

(72) Inventors: Lukas Kuhn, Oberreichenbach (DE); Horst Hartmann, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/010,447

(22) PCT Filed: Jun. 22, 2021

(86) PCT No.: PCT/DE2021/100529
§ 371 (c)(1),
(2) Date: Dec. 14, 2022

(87) PCT Pub. No.: WO2022/002305
PCT Pub. Date: Jan. 6, 2022

(65) Prior Publication Data
US 2023/0313894 A1    Oct. 5, 2023

(30) Foreign Application Priority Data
Jun. 29, 2020 (DE) ..................... 10 2020 116 993.0

(51) Int. Cl.
*F16K 15/02* (2006.01)
*F16K 27/02* (2006.01)

(52) U.S. Cl.
CPC ........ *F16K 15/025* (2013.01); *F16K 27/0209* (2013.01)

(58) Field of Classification Search
CPC ............... F16K 15/025; F16K 27/0209; Y10T 137/7925
See application file for complete search history.

(56) References Cited

U.S. PATENT DOCUMENTS

| 9,062,644 B2 | 6/2015 | Erb |
| 9,534,596 B2 | 1/2017 | Watanabe et al. |
| 2011/0076171 A1* | 3/2011 | Park ...................... F16K 15/026 417/571 |

(Continued)

FOREIGN PATENT DOCUMENTS

| DE | 3722053 A1 | 3/1988 |
| DE | 102019108694 A1 | 4/2020 |

(Continued)

*Primary Examiner* — P. Macade Nichols

(57) ABSTRACT

A valve includes a valve housing and a piston. The housing has an end face with a first opening, a second opening with a closing edge, and a valve seat. The piston has a first surface pointing towards the end face, a first lateral surface, a control edge, and a second lateral surface. In a first switching mode, the first surface covers the first opening, the piston seals with the valve seat, the second opening is closed by the second lateral surface, and the control edge is between the closing edge and the valve seat. In a second switching mode, the second opening is closed by the second lateral surface and the control edge is between the closing edge and the valve seat. In the third switching mode, a section of the second opening is released to form a flow chamber permeably connecting the first opening and the second opening.

20 Claims, 4 Drawing Sheets

(56) References Cited

U.S. PATENT DOCUMENTS

| | | |
|---|---|---|
| 2013/0233413 A1 | 9/2013 | Williamson |
| 2014/0311596 A1 | 10/2014 | Kim et al. |
| 2018/0128390 A1* | 5/2018 | Lin .................... F41B 11/72 |

FOREIGN PATENT DOCUMENTS

| | | |
|---|---|---|
| EP | 1628056 A1 | 2/2006 |
| FR | 2817014 A1 | 5/2002 |
| WO | 2005095832 A1 | 10/2005 |

* cited by examiner

VALVE AND METHOD FOR CONTROLLING A FLOW MEDIUM USING THE VALVE

CROSS-REFERENCE TO RELATED APPLICATIONS

This application is the United States National Phase of PCT Appln. No. PCT/DE2021/100529 filed Jun. 22, 2021, which claims priority to German Application No. DE102020116993.0 filed Jun. 29, 2020, the entire disclosures of which are incorporated by reference herein.

TECHNICAL FIELD

The present disclosure relates to a valve having a valve housing and a piston, and a method for controlling a flow medium using the valve.

BACKGROUND

DE 10 2019 108 694 A1 describes a valve of this type. The valve has a housing with an end face opening and an opening radially removed from the valve axis (transverse opening). The piston is of a two-stage design and is guided axially movably on the inner wall of the valve housing. One piston stage is smaller in diameter than the other. Between the piston stages, a connecting section of the piston is formed which is almost conical to the valve axis and is used to bridge the difference in diameter. A compression spring is clamped axially between the piston crown and a support element. The support element is fixed to the valve housing.

The valve operates in two switching modes. The piston has a piston surface on the end face on the piston crown which, in a first switching mode of the valve, radially covers the opening cross-section of the end face opening in the valve housing from the inside. In addition, a further annular piston surface, which is equivalent in function to a closing edge, rests in sealing contact with a sealing seat of the valve housing in the first switching mode. Consequently, in the first switching mode, the end face opening of the valve is closed by the piston. An annular space is formed between the connecting section of the piston and an end face section of the valve housing and a hollow cylindrical section of the valve housing in the first switching mode. The axial extent of this annular space can be varied depending on the piston stroke and has the end face opening as the inlet and the transverse opening as the outlet.

In a second switching mode, axial forces are exerted on the piston by a flow medium acting with pressure on the piston surface, which overcome the spring forces of the compression spring and generate a piston stroke. With that, the piston lifts off the end face opening or the valve seat. The flow medium flows from the end face opening towards the transverse opening through a flow channel, which is formed by the annular space.

SUMMARY

The present disclosure provides a valve with improved valve characteristics.

The valve according to the disclosure has at least one valve housing and one piston. The piston is guided in the valve housing so that it can move axially along a valve axis. The axial directions opposite to one another are accordingly defined as the longitudinal directions in which the piston is movably guided in the valve housing. Radial direction(s) are thus aligned transverse to the valve axis.

In general, the valve is a component of a device with which the pressure, flow velocity and flow direction of flow media are controlled.

The valve sits in a housing. The housing is, for example, the housing of a vehicle transmission or alternatively a machine part of the vehicle transmission, such as a shaft or a hub. A flow channel leads to an end face opening in the valve housing. Alternatively, the end face opening opens into a chamber. At least one transverse opening is formed in the valve housing. The transverse opening also opens into a flow channel or a chamber.

The piston is a hollow cylindrical component designed to be cup-shaped and has two stages, which are defined by diameters that differ from one another. The first stage is smaller in diameter than the second stage. The piston may be formed from sheet metal but can, alternatively, also be solidly pressed or formed from cast material. It is axially movably guided via an outer cylindrical region of a lateral surface of the second stage on the inside of the inner cylindrical lateral surface of the valve housing. In this regard, the lateral surface can cover the entire second piston stage, but alternatively can also be only an outer cylindrical section of the second piston stage.

A first piston surface is formed on the end face on the piston crown of the first piston stage.

According to one embodiment, a second piston surface radially outwardly adjoins the first piston surface. The second piston surface is followed axially by an outer cylindrical first lateral surface of the first piston stage. According to one embodiment, a third piston surface is formed radially between the lateral surface of the first piston stage and a control edge of the piston. The total effective area of the piston under pressure is increased due to the additional second and third piston surfaces, and the response is improved at the same pressure of the flow medium due to increased piston forces. The geometry of the second piston surface can alternatively correspond to only one edge.

The control edge of the piston closes the third piston surface radially outwardly and is a body edge, which is guided along the inner lateral surface of the valve housing in a sliding manner to form a seal. An outer cylindrical second lateral surface of the second piston stage axially adjoins the control edge.

The valve seat is either formed separately from the valve housing and is supported on or attached to the valve housing, or is formed directly on the material of the valve housing. The valve housing may be a formed part made of sheet steel.

The valve housing is generally a hollow cylindrical component, the hollow cylinder of which is provided with a bottom on one end. The bottom has the end face opening. At least one second opening (transverse opening) is formed in the hollow cylinder. The hollow cylinder can also have a plurality of circumferentially spaced and/or axially offset second openings.

The piston is loaded with at least one spring, e.g., a compression spring. Compression springs are available in bulk in a wide variety of designs at low cost and thus the operating ranges of the valve can be individually adapted to different requirements, for example by selecting one or more springs with suitable spring forces (closing force or control forces). Such adjustments and changes to the spring are possible even if the design of the valve is otherwise unchanged.

Three switching modes of the valve or device are provided. In the first switching mode, the valve is closed. The piston rests in sealing contact with the valve seat. There is no passage for flow media between the end face opening and the transverse opening. In the second switching mode, the end face opening of the valve is released by the piston and flow medium can flow into the interior of the valve. The control edge of the piston still rests in sealing contact with the valve housing, so that even in the second switching mode there is still no passage between the first and second openings.

The control edge of the piston rests axially in sealing contact between the closing edge of the second opening of the valve housing and the valve seat in a section of the valve housing extending between the valve seat and the closing edge. No passage for flow medium is formed between the end face opening and the transverse opening in the second switching mode either. In the third switching mode, the piston is retracted axially to such an extent that the control edge releases part of the transverse opening. In the device, the flow medium can flow from one flow channel through the end face opening and a flow chamber formed in the valve and from there through the second opening into another flow channel or back to the first opening and from there into the other flow channel.

In the first switching mode, as already mentioned, the valve is closed, i.e., the first opening is closed by the piston. For this purpose, a first piston surface of the piston, with a view from the flow channel at the first opening in the valve housing, covers the first opening from the inside and, at the same time, a second piston surface rests against a valve seat under the action of a closing force. In the first switching mode, the pressure of the flow medium acting on the first piston surface through the end face opening is either equal to zero or so small that the axial actuating force acting on the piston surface is less than a closing force with which the piston is preloaded against the valve seat, for example by means of a spring, in a sealing manner.

As soon as the piston lifts off the valve seat, the closing force of the spring(s) is canceled and control forces act on the piston. The control force acting on the piston can also be generated by a flow medium or, as provided in an example embodiment, is generated by means of the spring characteristic(s) of one or more compression springs inserted in the valve.

In the first switching mode of the device, the second opening (transverse opening) is completely closed by an outer lateral surface (second lateral surface) of the second piston stage. Inside the valve, an annular space or closed annular chamber is delimited by a section of the inner lateral surface of the valve housing, the first lateral surface of the first piston stage and by the third piston surface. The control edge of the piston is positioned axially between the end face of the valve and the second opening. More specifically, the control edge of the piston is positioned axially between a closing edge formed at the first opening of the valve housing and the end face of the valve housing, where it rests in radially sealing contact with a section of the valve housing.

Radial sealing is defined in the sense of the disclosure alternatively as pressure-tight or partially permeable across a leakage gap.

An outer cylindrical lateral section of the second piston stage axially adjoining the control edge is guided in a radially sealing manner on an inner cylindrical lateral section of the valve housing. The inner cylindrical lateral section of the valve housing extends axially between the section of the inner lateral surface of the valve housing delimiting the annular chamber and the closing edge formed at the second opening. The closing edge is formed on the border of the second opening or is a section of this border and delimits the second opening in the direction of the end face of the valve in radial contact with the piston.

Consequently, in the second switching mode, a passage through the valve is not yet open. The actuating force caused by the pressure of the flow medium on the first piston surface at the end face opening generates an opening force. The opening force is greater than the closing force of the piston. This causes the piston to lift off the valve seat. In contrast to the prior state of the art, this opening force causes an axial stroke of the piston, but not the final opening of the valve. The piston initially only lifts axially from the valve seat. The pressure of the flow medium "fills" the annular chamber and also acts on the third piston surface. The total piston surface on which the pressure of the flow medium acts is increased. Because the control edge of the piston is still positioned axially between the closing edge and the end face of the valve and the second opening is therefore not yet released by the piston, this inevitably leads to an increase in the actuating forces on the piston. Control forces are generated, which cause the piston stroke and finally lead to the third switching mode of the valve.

In the third switching mode, the control edge of the piston is pushed axially over the closing edge of the second opening (transverse opening) under the action of the control forces, so that a second opening cross-section delimited by the control edge and the closing edge is formed at the second opening. A free passage from the flow channel via the end face first opening and from there into the annular chamber now formed as a flow chamber and from there through the second opening is released. The flow medium can continue to flow between the flow channels until a drop in pressure of the pressure medium causes a stroke reversal and thus displacement of the piston in the direction of the valve seat and the control edge moves over the closing edge again. In the event of a slight pressure drop, the pressure of the pressure medium initially acts again on the piston surface composed of the three piston surfaces, and the resulting counterforce dampens the movement of the piston in the direction of the valve seat.

The difference between the disclosure and the valve according to prior art described in the "Background of the invention" section of DE 10 2019 108 694 A1 is, for example, that the design of the valve according to the disclosure allows for three switching modes instead of two. As a result, the valve has improved control characteristics and control behavior compared to the prior art.

In the valve disclosed in DE 10 2019 108 694 A1, in the first switching mode, there is an outward connection permeable to flow media between the annular space and the outer environment of the valve via the second opening, i.e., the second opening is not completely closed by the piston in the first switching mode. Consequently, in the second switching mode, immediately after the closing force is overcome and the piston is lifted off the valve seat, the flow medium flows from the end face opening back into the environment via the annular chamber inside the valve through the transverse opening. The advantage of this arrangement is that the valve responds quickly, i.e., the valve opens quickly. However, the piston stroke by which the piston is moved axially away from the valve seat in the second switching mode is relatively short. In addition, the "sensitivity" of the spring is limited due to the short spring travel. The control forces on the piston are always close in magnitude to the closing forces of the spring.

After opening the valve in the second switching mode, the actuating force acting on the piston surface is relatively quickly reduced below the level of the preloading force (closing force) of the spring due to the pressure compensation, so that the piston is guided back against the valve seat by the forces of the spring and the valve is closed again for a short time. Shortly afterwards, however, the pressure on the piston surface is again so high that the piston lifts slightly off the valve seat again. This change from the first switching mode to the second switching mode takes place at a high frequency due to the short piston stroke, so that the piston of the valve known from the prior art begins to "flutter" back and forth between these two positions in an undesirable and detrimental manner. Not only does this cause undesirable noise, but it can also negatively affect the functions of the device operated or controlled by the flow medium.

Due to the special design of the disclosed valve, for example, due to the sealing contact of the control edge of the piston axially between the closing edge of the second opening and the end face of the valve housing or the first opening on an inner cylindrical section of the valve housing, a passage for the pressure or flow medium through the valve is prevented in the second switching mode, because the second opening is still closed by the skirt of the piston also in the second switching mode. Overall, the piston stroke is increased because the distance of the second opening or the closing edge of the second opening from the valve seat is increased by the inner cylindrical section. The reaction times of the piston between the first and third mode are increased, which also prevents "flutter".

In the second switching mode, the effective piston surface is first increased, thus generating a higher actuating force on the piston. The second switching mode is an intermediate switching mode, so to speak, using which the reaction of the piston to the compensation of the actuating and control forces is damped and calmed by increased control forces. The third piston surface, located radially between the control edge and the outer lateral surface of the first piston stage, changes the response of the piston because the opening force on the piston is converted into greater control forces by the pressure of the flow medium acting on the enlarged piston surface (actuating force=product of total piston surface and the pressure of the flow medium acting on the piston surface). The total piston surface in the second switching mode is the sum of the first piston surface and the third piston surface and approximately an outline of the second piston surface in any imaginary radial plane, in which the third piston surface formed as an annular surface and the first piston surface formed as a circular surface can also be reproduced. The movement of the piston under the influence of the higher control force is damped and the undesirable high-frequency oscillations of the piston between the first and second switching modes are avoided.

The position of the piston in the disclosed valve away from the valve seat is maintained even at low pressures due to the increased actuating force resulting from the larger piston surface, under the influence of which the piston on the valve of the previously known prior art would already strike against the valve seat again. The valve reacts with a higher degree of sensitivity. The valve does not open a passage for the flow medium in the additional third switching mode until the control edge of the piston releases a slot of the second opening delimited by the closing edge of the second opening and the control edge of the piston. Only now does the pressure on the piston quickly decrease and the piston moves back axially in the direction of the valve seat. The control edge moves axially over the closing edge so that the second opening is closed again. However, the piston cannot hit the valve seat because the pressure of the flow medium now acts immediately on the three piston surfaces and the actuating force on the piston approaches the closing force of the spring(s) already at a slight pressure build-up. The movement of the piston back to the valve seat is damped.

One embodiment provides that the first piston surface and at least one annular surface of the third piston surface are planar surfaces lying in parallel radial planes and thus aligned parallel to one another, i.e., the first piston surface may be a circular surface and the third piston surface may be an annular surface. However, it is also conceivable that one or both piston surfaces are axially curved convexly or concavely in one or the other direction. The design of the piston surface can be used to adjust the reaction behavior of the piston and thus of the valve, but also to positively influence the self-cleaning of the valve from residues/deposits of the flow medium.

According to a further embodiment, the third piston surface has two sections. The one section that radially adjoins the first lateral surface of the first piston stage is the annular surface. The other section, which extends radially outwardly from the annular surface to the control edge, has a curved or straight course inclined toward the valve axis as viewed in any longitudinal section along the valve axis. The geometry of the second section may be described by the lateral surface of a truncated cone. Such a measure prepares a sharp transition to the control edge, which also keeps the contact between the inner lateral surface of the valve housing and the piston free of deposits when the piston moves.

BRIEF DESCRIPTION OF THE DRAWINGS

The present disclosure is explained in more detail below with reference to an exemplary embodiment. In the figures.

DETAILED DESCRIPTION

Figure 1:
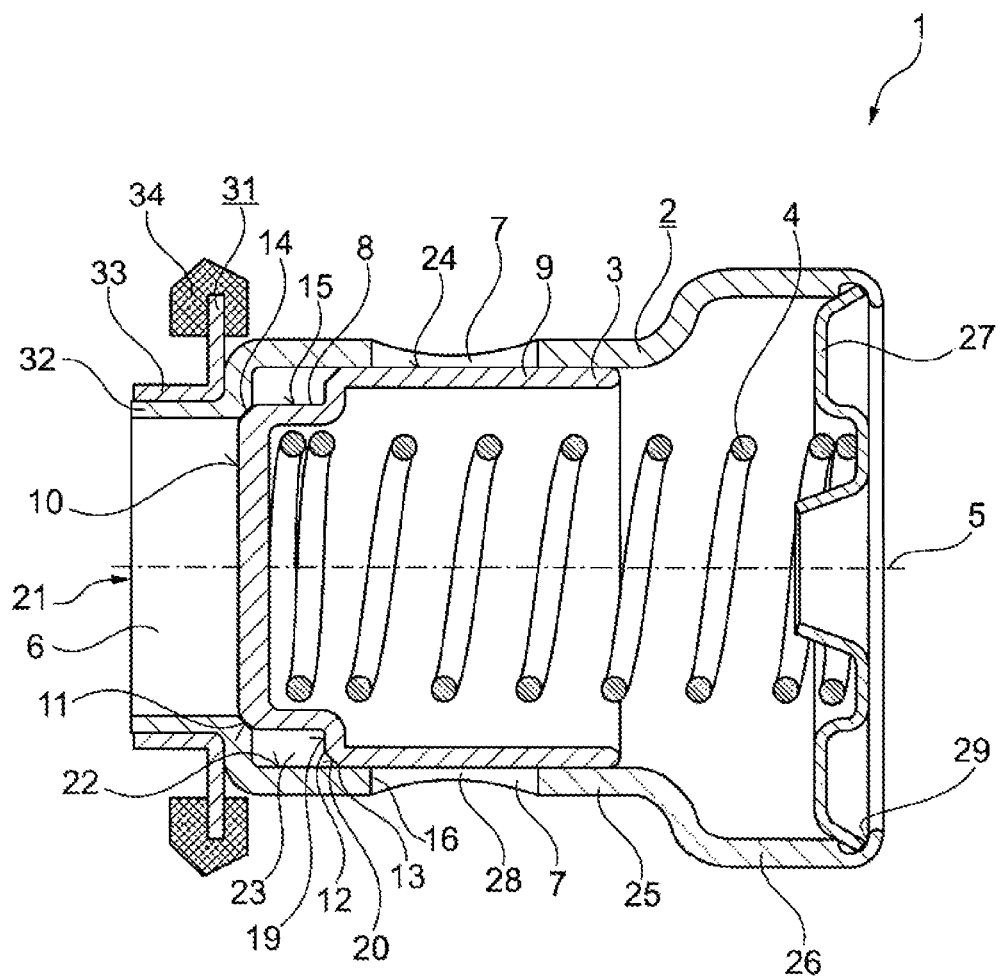
FIG. 1 shows a valve 1 in a longitudinal section along the valve axis 5 of the valve 1.

The following description is made with reference to FIG. 1. The valve 1 includes a valve housing 2, a piston 3, a spring 4, a seal 31 and a support element 27. The piston 3 is guided radially in the valve housing 2 and pressed axially against a valve seat 14 by the spring 4. For this purpose, the spring 4 dips axially into the piston 3 and rests there against the bottom of the piston 3. The seal 31 sits on a neck 32 of the valve housing 2, which surrounds a first opening 6. The seal 31 is provided with a reinforcement 33, which supports and reinforces a sealing lip 34.

The valve housing 2 is of a two-stage design and is provided with a first housing stage 25 and a second housing stage 26. The housing stages 25 and 26 are designed to be essentially hollow cylindrical. The first housing stage 25 is smaller in diameter than the second housing stage 26. The first housing stage 25 has the first opening 6 at an end face 21. The first opening 6 is surrounded by the neck 32 of the valve housing 2. The first housing stage 25 is also provided with at least two second openings 7, which are formed as transverse openings radially spaced from the valve axis 5 in the valve housing 2. The valve housing 2 shown is a thin-walled formed part made of sheet metal and is provided at an end facing away from the end face 21 with a flanging step at which the wall thickness of the valve housing 2 is reduced and flanged. Due to the flanging step, the rear border of the valve housing 2 is slightly bent radially on the circumferential side in the direction of the valve axis 5, so that a circumferential groove 29 is formed. The support element 27 is firmly supported in the circumferential groove 29. The spring 4 is a helical spring, which is axially clamped between the bottom of the piston 3 and the support element 27. The first opening 6 is followed inside the valve housing 2 by a valve seat 14 embossed in the material of the valve housing 2.

The second opening 7 is circumferentially bordered by a border 28 and is provided at the border 28 axially towards the end face 21 with a closing edge 16, which is formed there by a section of the border 28 on the spot, but can also be provided separately.

The piston 3 is a thin-walled and cup-shaped formed part made of sheet metal and has a first piston stage 8 and a second piston stage 9. The bottom of the piston 3 is provided on the side of the first opening 6 with a flat first piston surface 10 formed as a radial circular surface.

Figure 2:
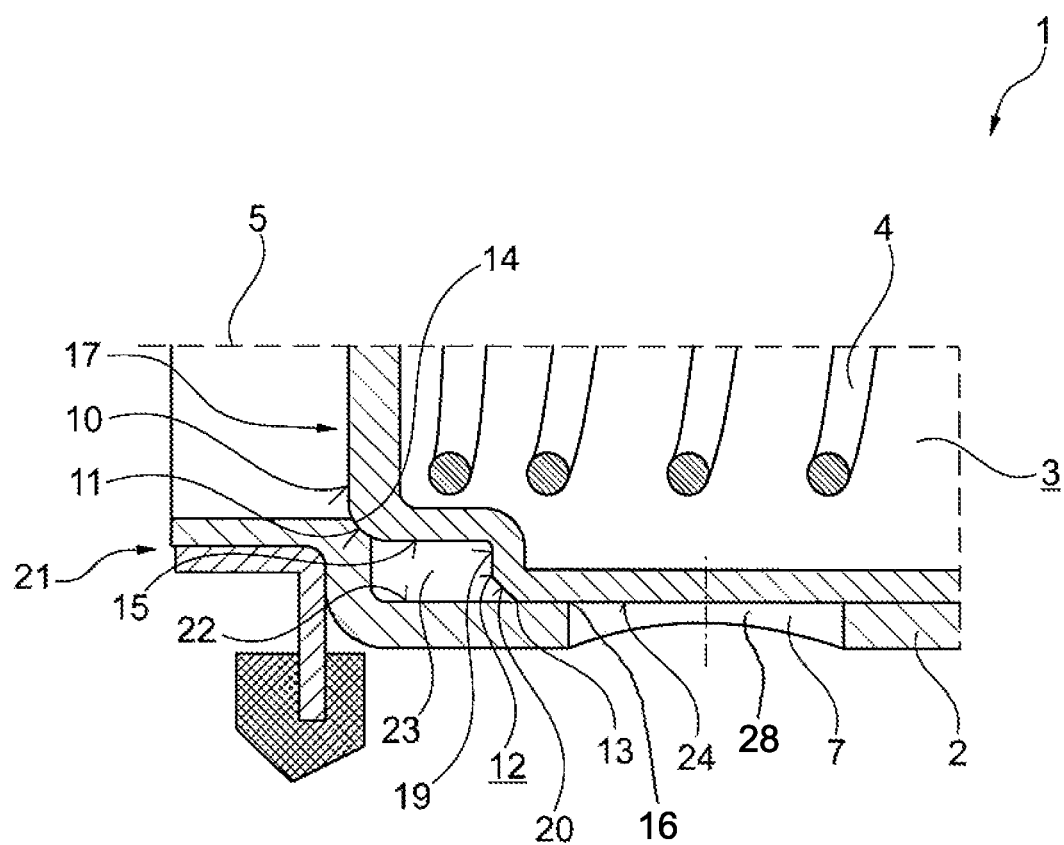
FIG. 2 shows a section of the valve 1 shown in FIG. 1 with the position of the piston 3 in a first switching mode of the valve 1.

The following description is made with reference to FIGS. 1 and 2. The first piston surface 10 is followed radially by a second piston surface 11. The first piston surface 10 is a circular surface which lies flat in an imaginary radial plane perpendicularly abutted by the valve axis 5. The second piston surface 11 extends in a curved manner, but can alternatively be formed from one or more surface sections provided with either a curved contour and/or the contour of a surface of a truncated cone. An outer cylindrical first lateral surface 15 is formed on the outer circumference of the first piston stage 8. The first piston surface 10 ends at the second piston surface 11, and the second piston surface 11 merges radially into the first lateral surface 15 of the first piston stage 8.

The first lateral surface 15 is followed by a third piston surface 12. The third piston surface 12 merges at a control edge 13 of the piston 3 into an outer cylindrical second lateral surface 24 of the second piston stage 9. A section of the third piston surface 12 is a flat annular surface 19 lying in an imaginary radial plane perpendicularly penetrated by the valve axis 5. A further section 20 of the third piston surface 12 is formed as the lateral surface of a truncated cone. A section of the inner lateral surface 22 of the valve housing 2, the first lateral surface 15 and the third piston surface 12 together delimit an annular chamber 23.

The valve 1 is in a first switching mode. The piston 3 is in a closed position. The piston 3 is axially preloaded by the closing forces of the spring 4 and its second piston surface 11 rests in sealing contact with the valve seat 14.

The following description is made with reference to FIG. 2 depicting the first switching mode of the valve 1. The first piston surface 10 radially covers the first opening cross-section 17, formed as a circular surface, of the first opening 6 on the inside of the valve housing 2, thus closing it completely. A section of the second lateral surface 24 of the second piston stage 9 rests in sealing contact with an inner lateral surface 22 of the valve housing 2. The control edge 13 of the piston 3 is positioned axially between the end face 21 of the valve 1 or the valve seat 14 and the closing edge 16. The second lateral surface 24 completely covers the second opening 7 of the valve housing 2 in the axial direction and thus closes it, wherein the piston 3 in the first switching mode is in radially sealing contact with an outer cylindrical section of the second lateral surface 24 resting on an inner cylindrical section of the inner lateral surface 22 formed between the annular chamber 23 and the closing edge 16 and is guided there.

Figure 3:
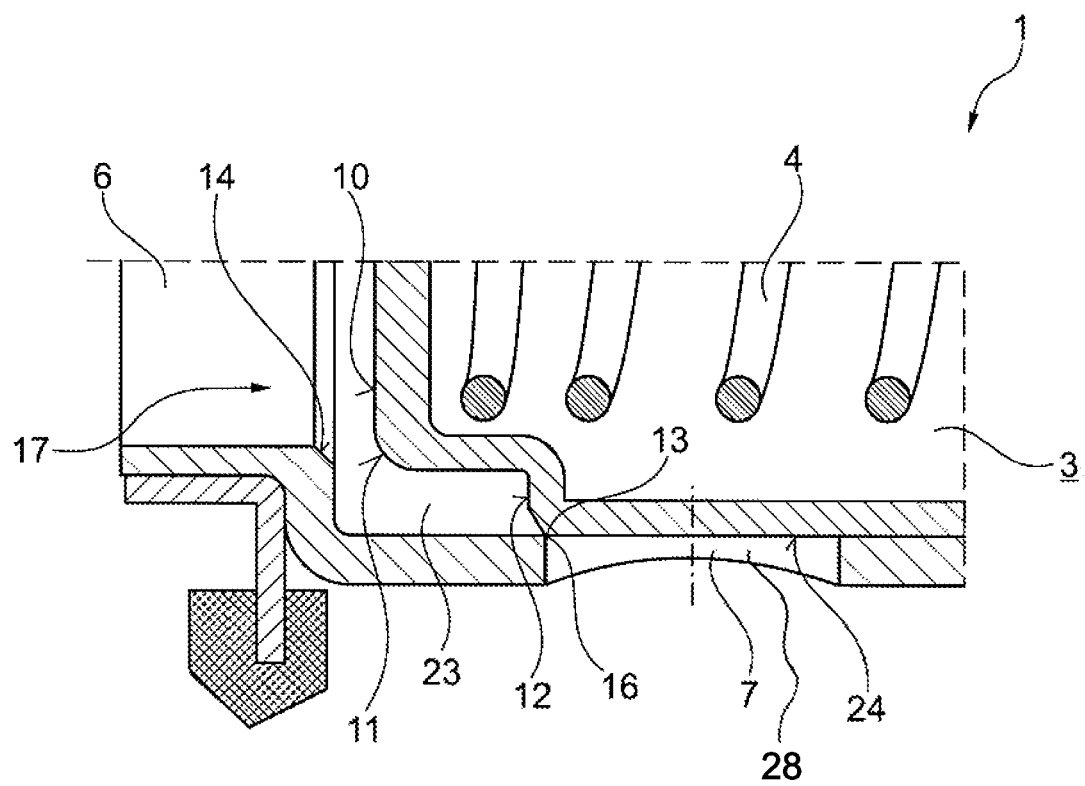
FIG. 3 shows the section shown in FIG. 2, but with the position of the piston 3 in a second switching mode of the valve 1

The following description is made with reference to FIG. 3 depicting the second switching mode of the valve 1. The piston 3 has been shifted to the right by the opening pressure of a flow medium, not shown, on the first piston surface 10 against the resistance of the spring 4 in the figure. The opening force lifted the second piston surface 11 off the valve seat 14. The volume of the annular chamber 23 is axially increased by the stroke of the piston 3 compared to the position of the piston 3 in the first switching mode (cf. FIGS. 1 and 2). In addition, the annular chamber 23 is open with respect to the first opening 6 and is freely accessible to the flow medium via the opening cross-section 17. The pressure of the flow medium acts on the piston surfaces 10, 11 and 12. Compared to the first switching mode (cf. FIGS. 1 and 2), the control edge 13 of the piston 3 has been moved axially away from the valve seat 14 and is approximately at the level of the closing edge 16, but without already releasing the second opening 7. The second lateral surface 24 still completely covers the second opening 7.

Figure 4:
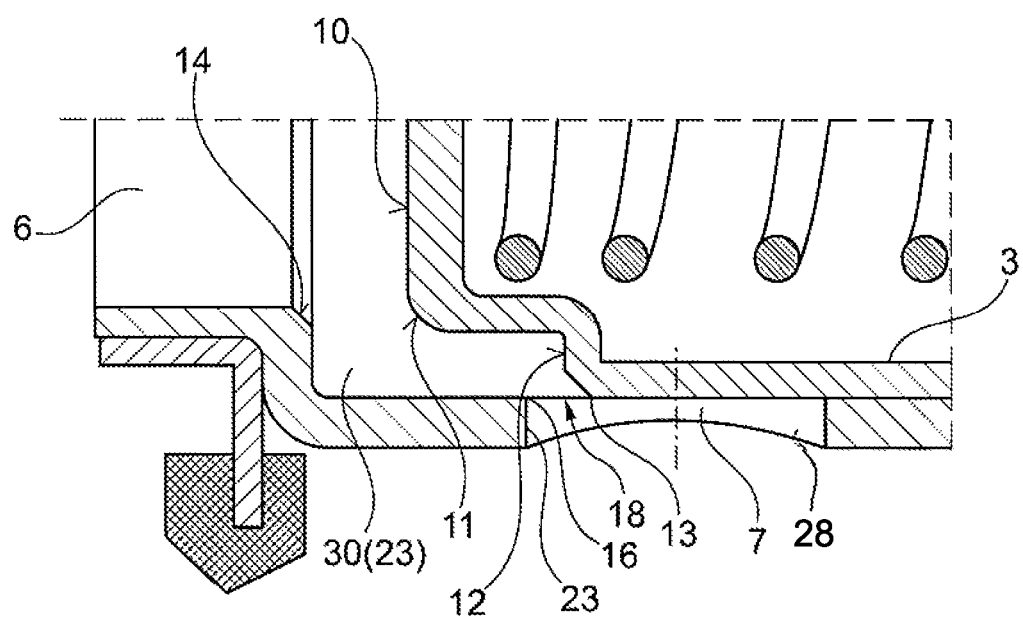
FIG. 4 shows the section shown in FIG. 3, but with the position of the piston 3 in a third switching mode of the valve 1.

The following description is made with reference to FIG. 4 depicting the third switching mode of the valve 1. As in the second switching mode (cf. FIG. 3), the piston 3 is in a position in which the second piston surface 11 is lifted off from the valve seat 14. The control edge 13 of the piston 3 was moved axially over the border 28 of the second opening 7 and thus beyond the closing edge 16 and the second opening 7 was thereby partially released by the piston 3. This results in a free second opening cross-section 18 of the second opening 7 delimited by the control edge 13 and the closing edge 16. A flow chamber 30 is formed, which permeably connects the first opening cross-section 17 of the first opening 6 and the second opening 7 and is delimited by the valve housing 2 and the piston surfaces 10, 11, 12. This means that, in the third switching mode, the annular chamber 23 is formed as the flow chamber 30 which is open in a passable manner for the flow medium from the first opening 6 via the annular chamber 23 towards the second opening 7.

REFERENCE NUMERALS

1 Valve
2 Valve housing
3 Piston
4 Spring
5 Valve axis
6 First opening of the valve housing
7 Second opening of the valve housing
8 First piston stage of the piston
9 Second piston stage of the piston
10 First piston surface
11 Second piston surface
12 Third piston surface
13 Control edge of the piston
14 Valve seat on valve housing
15 First lateral surface of the first piston stage
16 Closing edge of the second opening
17 First opening cross-section
18 Second opening cross-section
19 Annular surface of the third piston surface
20 Section of the third piston surface
21 End face of the valve
22 Inner lateral surface of the valve housing
23 Annular chamber
24 Second lateral surface of the second piston stage 25 First housing stage of the valve housing
26 Second housing stage of the valve housing
27 Support element
28 Border of the second opening
29 Circumferential groove
30 Flow chamber
31 Seal
32 Neck of the valve housing
33 Reinforcement of the seal
34 Sealing lip of the seal

The invention claimed is:

1. A valve comprising a valve housing and a piston, wherein
the piston is seated in the valve housing and displaceable along a valve axis of the valve from a first switching mode of the valve into a second switching mode of the valve and from a second switching mode into a third switching mode of the valve,
the valve housing has, on an end face, a first opening with a first opening cross-section and at least one second opening with a closing edge, wherein the closing edge is formed on a border delimiting the second opening,
the piston has a first piston stage with a first piston surface pointing towards the end face and with a first lateral surface,
the piston has a second piston stage with a control edge pointing towards the end face and with a second lateral surface,
the first piston surface covers the opening cross-section of the first opening in the first switching mode,
the piston rests in sealing contact with a valve seat of the valve housing in the first switching mode,
the second opening is closed in the first switching mode and in the second switching mode by a second lateral surface of the second piston stage, wherein the control edge is axially movably positioned between the closing edge and the valve seat in the valve housing in the first switching mode and in the second switching mode,
a free second opening cross-section of the second opening delimited by the control edge and the closing edge is released in the third switching mode in such a way that a flow chamber is formed, which permeably connects the first opening cross-section of the first opening and the second opening and is delimited by the valve housing and the piston surfaces.

2. The valve according claim 1, in which at least a section of the second lateral surface of the second piston stage rests in sealing contact with the valve housing in the first switching mode and in the second switching mode.

3. The valve according to claim 1, in which the piston is provided at the first piston stage with a second piston surface pointing towards the end face, wherein the piston in the first switching mode rests in sealing contact with the valve seat with the second piston surface, and wherein the second piston surface is lifted off from the valve seat in the second switching mode and in the third switching mode, and wherein the second piston stage is provided with a third lateral surface pointing towards the end face, wherein the third piston surface is formed radially between the first lateral surface and the control edge.

4. The valve according to claim 3, in which the first piston surface and at least one annular surface of the third piston surface are aligned to be parallel and coaxial to one another.

5. The valve according to claim 3, in which the third piston surface has an annular section, the contour of which, when viewed in any longitudinal section along the valve axis, is either curved and extends inclined to the valve axis or is described by a lateral surface of a truncated cone.

6. The valve according to claim 3, in which the third piston surface has an annular section with the contour of a truncated cone and wherein the control edge is formed by a body edge delimiting the third piston surface and the section radially outwardly and extending around the valve axis.

7. The valve according to claim 3, having an annular chamber extending around the valve axis and delimited by the third piston surface and by at least a section of an inner lateral surface of the valve housing and by the first lateral surface of the first piston stage.

8. The valve according to claim 3, having an annular chamber extending around the valve axis and delimited by the third piston surface and by at least a section of an inner lateral surface of the valve housing and by the first lateral surface of the first piston stage, wherein the annular chamber is closed in the first switching mode of the valve and is open in the second switching mode and in the third switching mode, wherein the annular chamber is open in the second switching mode towards the first opening and the annular chamber is formed as a flow chamber in the third switching mode which is open in a passable manner from the first opening via the annular chamber towards the second opening.

9. The valve according to claim 3, having an annular chamber extending around the valve axis and delimited by the third piston surface and by at least a section of an inner lateral surface of the valve housing and by the first lateral surface of the first piston stage, wherein the piston in the first switching mode is in radially sealing contact with an outer cylindrical section of the second lateral surface resting on an inner cylindrical section of the inner lateral surface formed between the annular chamber and the closing edge.

10. The valve according to claim 1, having a valve housing, which has at least a first housing stage and a second housing stage, wherein the housing stages differ from one another in terms of their external diameter and wherein the piston is axially movably guided along the valve axis on an inner lateral surface of the first housing stage and wherein the first housing stage is provided with the first opening and with at least one second opening and wherein the spring is axially supported in the second housing stage and resiliently clamped between the piston and a support element.

11. A method for controlling a flow medium using the valve of claim 1, wherein in a first switching mode, the valve is closed by the piston, in a second switching mode, an annular chamber in the interior of the valve is opened towards the first opening by an axial movement of the piston under the influence of pressure of the flow medium, and in a third switching mode, the valve is opened by the piston into a flow chamber which is passable for the flow medium from the first opening towards the second opening and in the opposite direction.

12. A valve comprising:
a valve axis;
a valve housing comprising:
an end face with a first opening, the first opening having a first opening cross-section;
a second opening with a closing edge formed on a border delimiting the second opening; and
a valve seat;
a piston seated in the valve housing and displaceable along the valve axis, the piston comprising:
a first piston stage comprising:
a first piston surface pointing towards the end face; and a first lateral surface;
a second piston stage comprising:
    a control edge pointing towards the end face; and
    a second lateral surface, wherein:
the piston is displaceable from a first switching mode of the valve into a second switching mode of the valve, and from the second switching mode into a third switching mode of the valve;
in the first switching mode:
    the first piston surface covers the first opening cross-section of the first opening;
    the piston rests in sealing contact with the valve seat;
    the second opening is closed by the second lateral surface; and
    the control edge is disposed axially between the closing edge and the valve seat;
in the second switching mode:
    the second opening is closed by the second lateral surface; and
    the control edge is disposed axially between the closing edge and the valve seat; and
in the third switching mode:
    a free second opening cross-section of the second opening delimited by the control edge and the closing edge is released to form a flow chamber permeably connecting the first opening cross-section and the second opening, the flow chamber being delimited by the valve housing, the first piston surface, a second piston surface, and a third piston surface.

13. The valve of claim 12, wherein, in the first switching mode and in the second switching mode, at least a section of the second lateral surface rests in sealing contact with the valve housing.

14. The valve of claim 12 wherein:
the first piston stage comprises the second piston surface pointing towards the end face;
the second piston stage comprises the third piston surface pointing towards the end face;
the third piston surface is formed radially between the first lateral surface and the control edge;
the second piston surface rests in sealing contact with the valve seat in the first switching mode; and
the second piston surface is lifted off from the valve seat in the second switching mode and in the third switching mode.

15. The valve of claim 14, wherein the first piston surface and an annular portion of the third piston surface are parallel and coaxial to one another.

16. The valve of claim 14, wherein:
the third piston surface comprises an annular section having a contour; and
the contour of the annular section is:
    curved or inclined to the valve axis with viewed in longitudinal section; or
    described by a lateral surface of a truncated cone.

17. The valve according to claim 14, wherein:
the third piston surface comprises an annular section with a contour of a truncated cone; and
the control edge is formed by a body edge delimiting the third piston surface and the annular section radially outwardly and extending around the valve axis.

18. The valve according to claim 14, further comprising an annular chamber extending around the valve axis, wherein:
the valve housing comprises an inner lateral surface; and
the annular chamber is delimited by:
    the first lateral surface;
    the third piston surface; and
    at least a section of the inner lateral surface.

19. The valve according to claim 18, wherein:
in the first switching mode, the annular chamber is closed by an outer cylindrical section of the second lateral surface resting on an inner cylindrical section of the inner lateral surface;
in the second switching mode, the annular chamber is open towards the first opening; and
in the third switching mode, the annular chamber is formed as the flow chamber which is open in a passable manner from the first opening via the annular chamber towards the second opening.

20. The valve of claim 12 further comprising:
a spring; and
a support element, wherein:
the valve housing further comprises
    a first housing stage comprising the first opening, the second opening, and an inner lateral surface; and
    a second housing stage having a different external diameter than the first housing stage;
the piston is axially movably guided along the valve axis on the inner lateral surface; and
the spring is axially supported in the second housing stage and resiliently clamped between the piston and the support element.

* * * * *